UNITED STATES PATENT OFFICE.

FREDERICK RANSOME, OF IPSWICH, ENGLAND.

IMPROVEMENT IN THE MANUFACTURE OF ARTIFICIAL STONE.

Specification forming part of Letters Patent No. 50,315, dated October 3, 1865.

*To all whom it may concern:*

Be it known that I, FREDERICK RANSOME, of Ipswich, in the county of Suffolk, England, a subject of the Queen of Great Britain, have invented or discovered certain new and useful Improvements in the Manufacture of Artificial Stone; and I, the said FREDERICK RANSOME, do hereby declare the nature of the said invention, and in what manner the same is to be performed, to be particularly described and ascertained in and by the following statement thereof—that is to say:

For the purpose of manufacturing artificial stone I mix sand-shingle, broken or pulverized stone, lime, or carbonate or sulphate of lime, carbonate or sulphate of baryta, glass, emery, or corundum, oxide of iron, clay, and other suitable substances, with a solution of soluble silicate of soda or potash, or of a soda or potash silicate of some earth or metal, and mold the compound into blocks or shapes afterward. When molded I wash over the surface with a solution of chloride of calcium or a solution of an equivalent decomposing salt, and subsequently either immerse in or saturate with a hot solution of chloride of calcium, so as to convert the soluble silicate into an insoluble silicate of lime, which agglutinates the several particles together into a hard and insoluble mass.

The character of the materials, as also their several proportions, may be varied to suit the conditions and circumstances under which the stone is intended to be used, but the following will make a very good hard stone, suitable for moldings and ornamental details: six hundred-weight clean, dry silicious sand; one hundred-weight dry and finely-powdered chalk; seven gallons of solution of silicate of soda, specific gravity 1.750, at a temperature of 60° Fahrenheit.

The above materials require to be thoroughly incorporated by means of a suitable mixing-mill, when the mixture will be sufficiently plastic to be pressed or rammed or rolled into suitable molds or shapes.

The molds may be made of iron, wood, or even of plaster-of-paris, or any other material suitable for such purpose.

Immediately upon removal from the mold, or as soon afterward as convenient, the product should be saturated with or immersed in a solution of chloride of calcium, which solution I prefer should be of a specific gravity of about 1.400 or 1.450, and at a temperature of from 200° to 212° Fahrenheit, where it should be allowed to remain until the chloride of calcium has completely penetrated the whole mass; or, where desirable, I force the chloride of calcium into the pores of the stone by means of pumps. The time necessary to effect this result will depend upon the nature of the materials employed and the dimensions of the articles produced, which is readily ascertained by experience.

As the materials become saturated with the solution of chloride of calcium a double decomposition of the solutions—viz., the silicate of soda or potash and of the chloride of calcium—immediately takes place; the silica combines with the lime of the chloride of calcium, forming an insoluble silicate of lime, while at the same time the soda, potash, or other alkali of the silicate combines with the chlorine or other solvent, forming a soluble salt, which may be removed by subsequent washing in water.

In situations where chalk or carbonate of lime cannot be readily obtained, clay or other suitable substances may be substituted in the same proportions; but in order to produce a close, hard, and compact stone it is important that the several materials—such as sand-shingle, chalk, clay, &c.—be perfectly dry, and that the chalk, or carbonate of lime, or clay should be ground and sifted fine, so as to fill up as nearly as possible the interstices between the particles of sand-shingle or other hard substances employed. The same materials may be used in the manufacture of pipes, &c., for conveyance of water or other fluids.

Where it is desired to produce blocks of stone for structural purposes, clean, dry stone-shingle or other hard fragments may be added to the mixture of sand and chalk or clay in almost any proportions, so long as a sufficient quantity of the finer materials—viz., sand and chalk, &c.—be present to fill up the interstices; and as it will be obvious that the particles of stone or shingle, &c., will not absorb the solutions, but will merely require what may be sufficient to coat their surfaces, the cost per cubic foot of the stone produced will be reduced in proportion to the quantity of stone, shingle, &c., employed.

In manufacturing stones or surfaces for grinding, I employ clean sharp sand, or broken glass, or corundum, or emery, (either with or without the admixture of pulverized flint, or chalk, or clay, or oxide of iron, or other matter,) which I mix with a soluble silicate, and afterward treat with a solution of chloride of calcium, as before described. I also employ a mixture of sand and pulverized chalk, or other suitable material, with a soluble silicate, as a plaster or cement, to coat walls and other surfaces, (and sometimes, in place of or in addition to sand, chalk, &c., I employ a proportion of lime;) but for this purpose I prefer to use the solution of soluble silicate of soda of a specific gravity of about 1.500, in order that the mixture may be as nearly as possible of the consistency of ordinary plaster, and applied to walls or other surfaces with a trowel. It is afterward treated with a solution of chloride of calcium, to convert the soluble silicate into an insoluble one. I prefer that the solution of chloride of calcium should be about 1.400 specific gravity, and the temperature thereof as near to 212° as convenient.

What I claim is—

The manufacture of artificial stone by mixing sand, chalk, or clay, with or without other matters, with a soluble silicate, which, after molding or plastering, is rendered insoluble, substantially as herein described.

FREDK. RANSOME.

Witnesses:
JOHN DEAN,
HENRY SOUTER,
*Both of No. 17 Gracechurch Street, London.*